(12) United States Patent
Plunk et al.

(10) Patent No.: US 10,539,396 B1
(45) Date of Patent: Jan. 21, 2020

(54) DUAL MODE SEEKER

(75) Inventors: Troy E. Plunk, Bedford, MA (US); James E. Hopson, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 05/692,088

(22) Filed: Jun. 2, 1976

(51) Int. Cl.
*F41G 7/00* (2006.01)
*F41G 7/22* (2006.01)
*G01S 13/88* (2006.01)
*G01S 13/86* (2006.01)
*G01S 13/00* (2006.01)

(52) U.S. Cl.
CPC ............ *F41G 7/008* (2013.01); *F41G 7/2253* (2013.01); *F41G 7/2286* (2013.01); *F41G 7/2293* (2013.01); *G01S 13/86* (2013.01); *G01S 13/88* (2013.01)

(58) Field of Classification Search
USPC ....................................... 244/3.14, 3.16, 3.19
See application file for complete search history.

(56) References Cited

U.S. PATENT DOCUMENTS

| 3,992,629 | A | * | 11/1976 | Chapman | ..................... 244/3.16 |
| 4,009,393 | A | * | 2/1977 | Ashley, Jr. et al. | ......... 244/3.16 |
| 4,009,848 | A | * | 3/1977 | Albert et al. | ................ 244/3.16 |
| 4,264,907 | A | * | 4/1981 | Durand, Jr. | ............. F41G 7/008 |
| | | | | | 342/53 |

\* cited by examiner

*Primary Examiner* — Bernarr E Gregory
(74) *Attorney, Agent, or Firm* — Raytheon Company (57) ABSTRACT

A dual mode RF/IR seeker suitable for use in an anti-radiation missile is disclosed. The infrared sensor is responsive to radiation within the 4.0 to 4.8 micron band and the radio frequency sensor is responsive to radio frequency signals within a 6.5 to 16.5 GHz band. The infrared sensor comprises a folded Cassegrainian telescope arrangement, including a primary mirror which is transparent to radio frequency energy. The radio frequency sensor comprises an annular array of orthogonally disposed stripline flared notch radiating elements. A broadband microwave receiver, fabricated in a multilayered stripline package, is provided for forming radio frequency monopulse sum' (E) and difference (A) signals and for converting such radio frequency monopulse signals to suitable intermediate frequency signals for processing in an I.F. receiver.

6 Claims, 7 Drawing Sheets

DUAL MODE SEEKER

BACKGROUND OF THE INVENTION

This invention relates generally to missile seekers which provide guidance information to direct a missile toward a desired target. More particularly, the invention relates to a dual mode missile seeker responsive to either infrared radiation or radio frequency energy from a target to guide a missile to such target.

Manned aircraft have been, and will continue to be, one of the principal means of weapons delivery in modern warfare. Manned aircraft combine accurate delivery of projectiles with the capability of reconnaissance and surveillance and can utilize the intelligence of airborne observers within the aircraft for location and identification of ground targets. Improved radar processing techniques such as synthetic aperture mapping can provide aircraft the capability of attacking ground targets under adverse weather conditions and at night. If allowed to roam freely in the airspace over the battlefield, aircraft can be the decisive factor in the ground engagement.

To counter this threat, highly effective ground-based antiaircraft defenses are being developed and deployed to reduce the probability of aircraft penetration of battle areas to such levels that sustained use of aircraft becomes impractical. These defense systems have one thing in common: They all use some form of radiation such as radar for search, acquisition, tracking or fire control. The radiation from the aforementioned defense systems may lie at any frequency within a large frequency band available to radar devices, and said radiation may have one of several polarization senses. A missile seeker designed to home in on such radiation, sometimes hereinafter referred to as an antiradiation missile (ARM) seeker, must therefore be capable of operating over greater than an octave band of frequencies and must be responsive to any one of several polarization senses.

To counteract the effectiveness of ground defense systems employing radar guided missiles against attacking aircraft, or to avoid detection by such ground defense systems, attacking aircraft may employ high power jamming signals to neutralize the ground defense radar. Anti-radiation missiles can attack such jamming aircraft providing that they continuously transmit jamming signals. If, however, sensing that they are under attack, the jamming aircraft cease transmitting, then the anti-radiation missile becomes ineffective unless it has an alternate guidance mechanism. Such alternate guidance mechanism must, however, ensure that the target may be acquired while the tracking loop of the seeker of the antiradiation missile is closed through the R.F. receiver.

SUMMARY OF THE INVENTION

With this background of the invention in mind, it is an object of this invention to provide a seeker for an ARM responsive to greater than an octave band of radar frequencies.

It is another object of this invention to provide a seeker for an ARM responsive to radio frequency signals having one of several polarization senses.

It is a further object of this invention to provide a seeker for an ARM responsive to both radio frequency signals and infrared radiation from a target to guide a missile to such target.

It is a still further object of this invention to provide a seeker for an ARM comprising a radio frequency (R.F.) sensor, responsive to radio frequency energy, and an infrared (IR) sensor, responsive to infrared radiation, wherein both of said sensors share a common boresight axis in order to facilitate the handover between different modes of operation.

These and other objects of the invention are attained generally by providing a dual mode seeker for an ARM comprising means for focusing infrared radiation at a spot in an image plane; a photodetector; means disposed between the image plane and photodetector for dispersing the infrared radiation on the face of the photodetector; means, responsive to the detected infrared radiation, for deriving guidance signals therefrom; means, mounted behind and sharing a common aperture with the infrared focusing means, for receiving radio frequency energy over greater than an octave band of frequencies; means, integral with the receiving means, for converting radio frequency signals to a suitable intermediate frequency (I.F.); means, responsive to the I.F. signals, for deriving guidance signals therefrom; and, means for selecting either the infrared or I.F. guidance signals to control the seeker in the ARM. In a preferred embodiment, the focusing means includes a folded optical arrangement made up of a primary and a secondary reflector, and the dispersing means includes a light pipe. The primary reflector is substantially transparent to radio frequency energy and the receiving means mounted behind the primary reflector includes a toroidal array of orthogonally disposed antenna elements surrounding the photodetector and light pipe. Means are provided to gimbal the folded optical arrangement and the toroidal array about a common axis. An I.F. and an IR receiver are also included for processing, respectively, the I.F. and the detected infrared signals, and a handover logic section is included in a common processor and controller for selecting the output signals from either the I.F. or IR receiver.

BRIEF DESCRIPTION OF THE DRAWINGS

The foregoing features of this invention, as well as the invention itself, may be more fully understood from the following detailed description read together with accompanying drawings, in which.

DESCRIPTION OF THE PREFERRED EMBODIMENT

Figure 1:
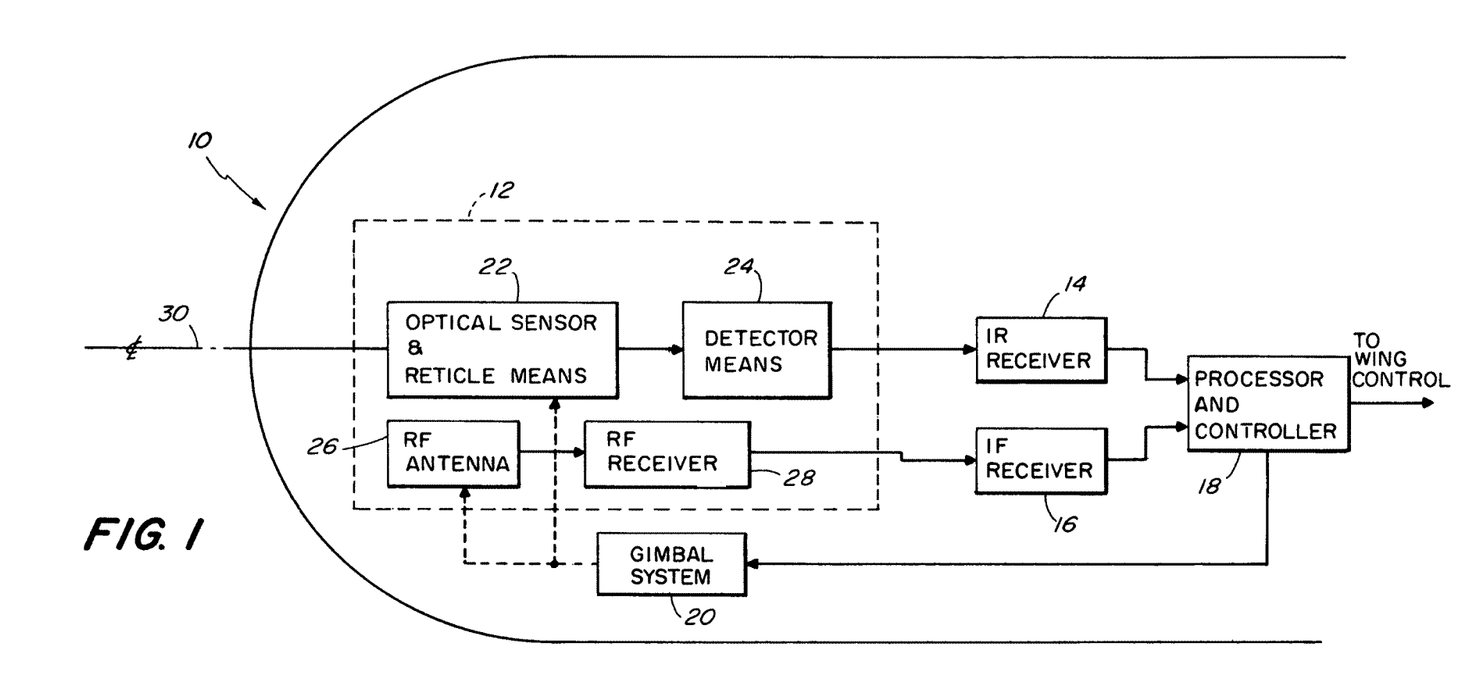
FIG. 1 is a simplified sketch of a portion of a missile incorporating a seeker according to the invention.

Referring now to FIG. 1, the frontal portion of an anti-radiation missile 10 (hereinafter sometimes referred to simply as ARM 10) is shown to include a seeker 12, an IR receiver 14, an I.F. receiver 16, a processor and controller 18 and a gimbal system 20. Such ARM 10 is adapted to be directed towards a target (not shown) by guidance signals developed within the missile. Such guidance signals are developed in response to electrical signals produced by seeker 12 in response to the portion of either radio frequency energy or infrared radiation emitted by the target which passes through the missile IR dome (shown in greater detail in FIG. 2). Seeker 12, the details of which are described in connection with FIG. 2, includes an optical sensor and reticle means 22, a detector means 24, an R.F. antenna 26 and a R.F. receiver 28. The optical sensor and reticle means 22 direct infrared energy passing through the missile IR dome (shown in greater detail in FIG. 2) onto the detector means 24. The energy impinging upon the detector means 24 is modulated in accordance with the angular deviation of the target from the optical axis 30. The detector means 24 produces electrical signals in accordance with the modulation in a conventional manner. The electrical signals are passed to an IR receiver 14 and then to a processor and controller 18, both of which are here of conventional design, to develop control signals for the wing control section of the missile (not shown) and the gimbal system 20, also of conventional design. R.F. antenna 26 is arranged symmetrically about optical sensor and reticle means 22 on the same gimbal mount so that the boresight axis of R.F. antenna 26 is coincident with optical axis 30. R.F. receiver 28 is mounted directly behind R.F. antenna 26 on the same gimbal system. R.F. antenna 26 receives R.F. signals passing through the missile IR dome and directs them to R.F. receiver 28 wherein they are combined and down-converted to form I.F. monopulse sum and difference signals for I.F. receiver 16, here of conventional design. The signals from I.F. receiver 16 are sent to processor and controller 18 to also develop control signals for the wing control section of the missile and the gimbal system 20. Such gimbal system 20 is used to gimbal the optical sensor and reticle means 22, R.F. antenna 26 and R.F. receiver 28 within the missile to cause the optical sensor and reticle means 22 and R.F. antenna 26 to track the target.

Figure 2:
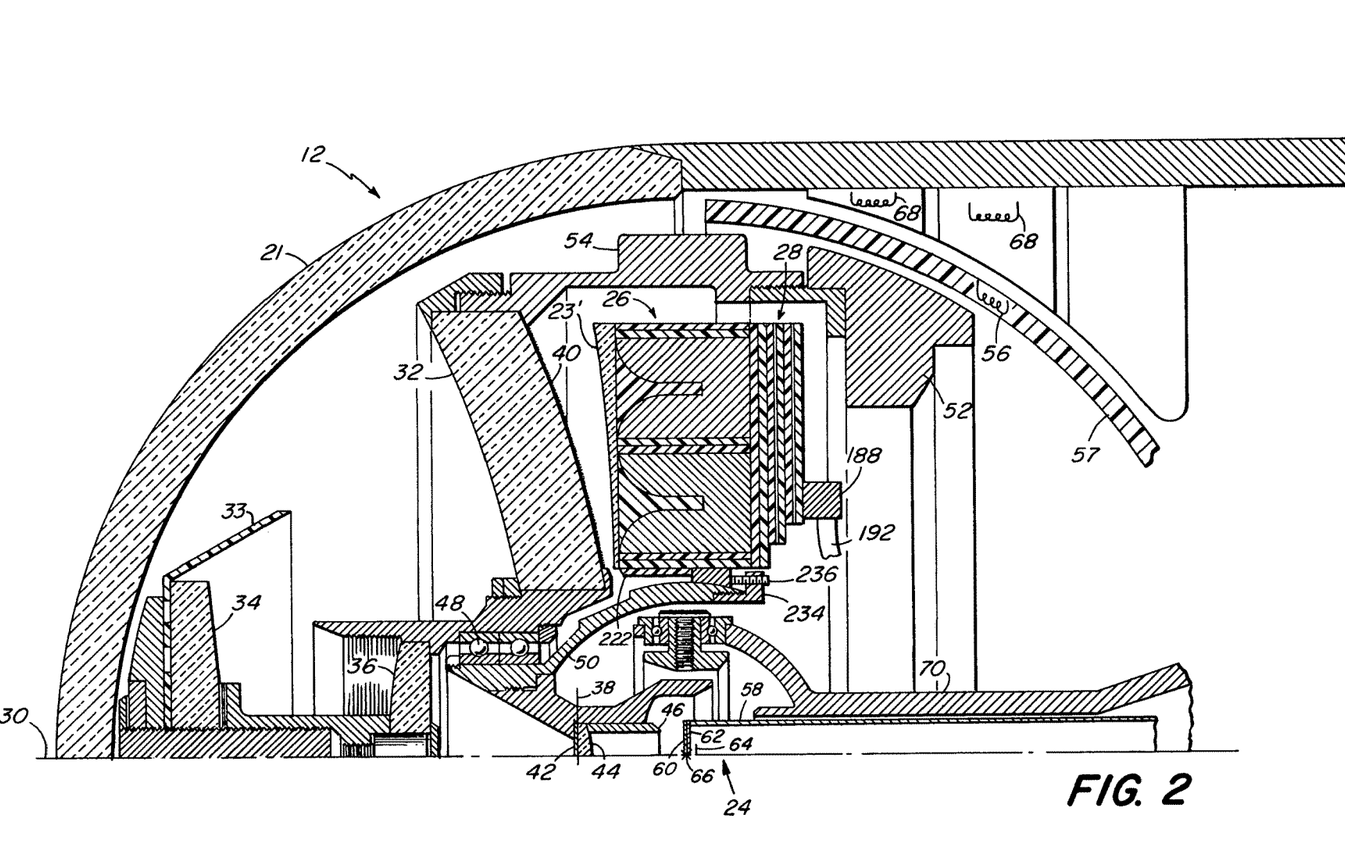
FIG. 2 is a sketch, greatly simplified, illustrating a seeker according to the invention.

Referring now to FIG. 2, seeker 12 is shown to include a catadioptric system including a spherical Mangin primary mirror 32, a convex secondary mirror 34, such mirror being tilted with respect to a plane normal to the optical axis 30, and a plano-convex support lens 36, here made of sapphire. The catadioptric system focuses a portion of the infrared energy passing through the missile's frontal portion onto a small spot in an image plane 38. The frontal portion of seeker 12 comprises an IR dome 21, here made of magnesium fluoride, rigidly mounted to the missile, here by means of a suitable epoxy (not shown). Such IR dome 21 is substantially transparent to both infrared radiation and radio frequency energy. The body of the spherical Mangin primary mirror 32 is also made of magnesium fluoride with an overlying reflecting surface 40 made up of a multilayer coating of zinc sulfide and thorium fluoride. Such coating is substantially transparent to radio frequency energy and acts as a good reflector for infrared radiation in the 4.0 to 4.8 micron band. The secondary mirror 34 is used to fold the path of infrared energy within the optical sensor. The secondary mirror 34 and one surface of the plano-convex support lens 36 are curved to control aberrations within the optical sensor. Disposed coincident with the image plane 38 is a reticle 42, here of conventional design. Such reticle 42 is affixed, here by means of a vapor deposition process, to a field lens 44. Such field lens 44 is here germanium and, due to its relatively high index of refraction, the front surface of field lens 44 must be coated with a layer of anti-reflection material (not shown, and of conventional design) to prevent Fresnel reflection losses. Lens 44 is affixed, by any convenient means, again as by a suitable epoxy (not shown), within a light pipe 46. Here the light pipe 46 is hollow, having a rectangular cross-section along the optical axis 30. The interior portion of such light pipe 46 is coated with a reflective material suitable for reflecting infrared energy, for example, gold. Primary mirror 32, secondary mirror 34, and plano-convex support lens 36 are mounted through bearings 48 to the catadioptric system support structure 50. The primary mirror 32, secondary mirror 34 and support lens 36 are adapted to rotate with respect to support structure 50 about optical axis 30, here by mounting a permanent magnet 52, which forms the rotor of a brushless D.C. motor, to primary mirror 32. Permanent magnet 52 is located behind R.F. antenna 26, which does not rotate, and is affixed to primary mirror 32 by means of support structure 54. The stator of such brushless D.C. motor includes coils 56, mounted to a plastic support member 57, for establishing the electric field necessary to react with permanent magnet 52 in a conventional manner.

Completing the seeker 12 (FIG. 1) is a detector means 24 shown in FIG. 2 to include a Dewar flask 58, a sapphire Dewar window 60, a quartz filter 62, and a photodetector 64 (here an indium antimonide detector). Also included (but not shown) is a cryogenic chamber for enabling a suitable cryogenic substance to cool photodetector 64. Gimbal system 20 (FIG. 1) is a two-axis gimbal and is used to gimbal the optical sensor and reticle means 22, R.F. antenna 26 and R.F. receiver 28, all of which are mounted to gimbal structure 70 (FIG. 2), about pivot point 66 by means of the interaction of permanent magnet 52 with precession coils 68. Also included is a sun shade 33 to reduce the amount of undesired radiation entering seeker 12.

The operation of such an optical sensor is described in detail in U.S. Pat. No. 3,872,308, issued Mar. 18, 1975 and assigned to the same assignee as the present application. Suffice it to say here that such arrangement is responsive to infrared radiation from a target to provide guidance information to such target in accordance with the angular deviation of the target from the optical axis 30 (or boresight axis) of the seeker 12.

Figure 3:
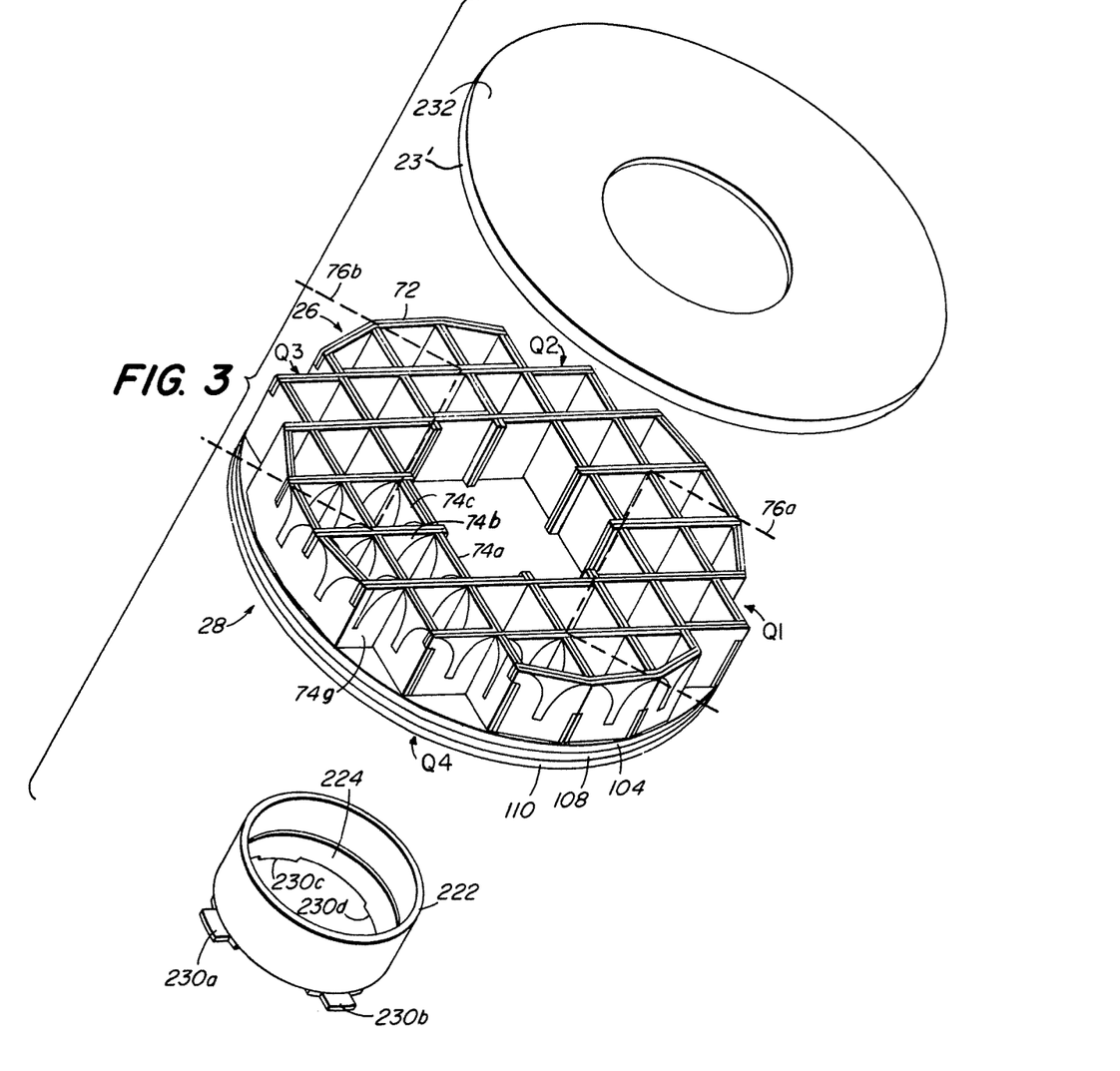
FIG. 3 is an isometric drawing, greatly simplified and exploded, of the radio frequency antenna of FIG. 1.

Referring now to FIG. 3, R.F. antenna 26 (FIG. 1) is shown to include an annular antenna array 72 (hereinafter sometimes referred to simply as array 72) comprising a plurality of stripline flared notch radiators 74a ... 74n, with only radiators 74a, 74b, 74c and 74g being numbered. Array 72 has an outside diameter of 3.5 inches and the hole in the center is 1.5 inches in diameter to permit photodetector 64 (FIG. 2) to be concentrically located within array 72. Array 72 is positioned behind primary reflector 32 (FIG. 2) and receives radio frequency energy through such reflector. Array 72 is designed to operate over a band of frequencies from 6.5 to 16.5 GHz. Primary reflector 32 is designed to be approximately one-half wavelength thick at the center band frequency of 11 GHz in order to maximize the transmission of radio frequency energy through such reflector. The thickness of hemispherical dome 21 (FIG. 2), on the other hand, is chosen to minimize the boresight error of antenna array 72. The thicknesses of primary reflector 32 and hemispherical dome 21 (FIG. 2) are here approximately 0.340 and 0.213 inches, respectively.

Radiators 74a . . . 74n are disposed in a square lattice configuration. Adjacent pairs of radiators, for example the pair of radiators 74a, 74b, are fed in phase quadrature (in a manner to be described in greater detail hereinafter) to provide, substantially, circular polarization. Such arrangement increases the utility of seeker 12 as array 72 will also be responsive to linearly polarized signals incident thereon. The spacing between radiators 74a . . . 74n, which is here approximately 0.500 inches, was chosen to provide optimum utilization of the available area, thereby to provide maximum antenna gain. Antenna grating lobe considerations would dictate a lesser radiator-to-radiator spacing; however, the selected element spacing provides a more uniform coupling between radiators 74a . . . 74n and minimizes the effect of any fault. A total of thirty-eight linear radiators is provided in both the vertical and horizontal planes. It should be noted here, however, that because of packaging constraints some radiators depart from the nominal radiator-to-radiator spacing, and some radiators, for example exemplary radiator 74g, are only one-half the width of the centrally located radiators. Such half radiators are included to maintain mutual coupling between radiators 74a . . . 74n at a more constant level.

For monopulse tracking purposes, radiators 74a . . . 74n are grouped into four separate quadrants, labeled, respectively, Q1 through Q4, and here shown separated by dotted lines 76a, 76b. Diagonally opposed quadrants Q1 and Q3 each contain nine cross-polarized radiators and diagonally opposed quadrants Q2 and Q4 each contain ten cross-polarized elements. Array 72 is physically symmetrical, and radiators 74a . . . 74n are fed (in a manner to be described in greater detail hereinafter) so that diagonal quadrant symmetry is maintained to negate effects from any errors common among quadrants upon boresight error. Boresight error requirements also impose very stringent phase tolerances on R.F. receiver 28 as will be described in greater detail hereinafter.

Figure 4:
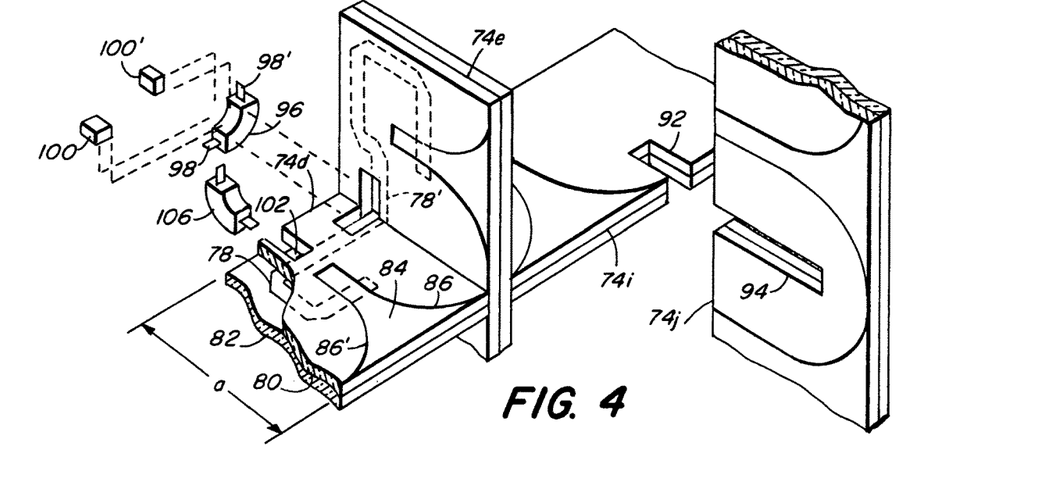
FIG. 4 is an isometric drawing of a pair of antenna elements of radio frequency antenna of FIG. 1.
Figure 4A:
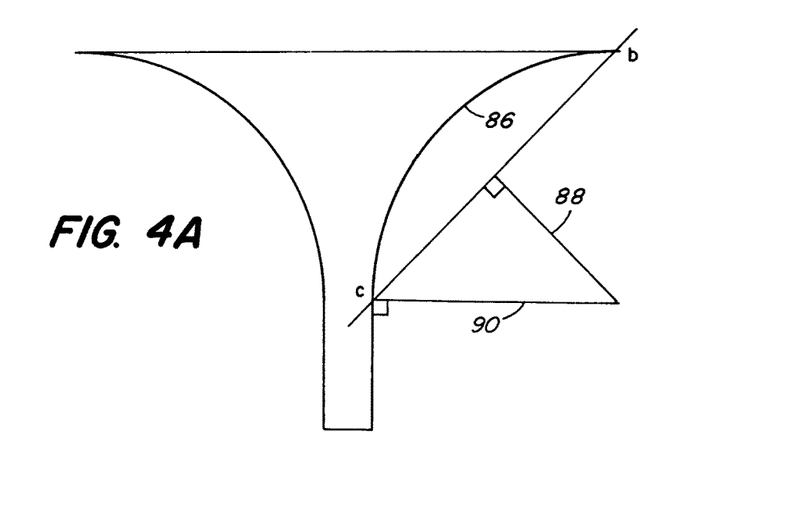
FIG. 4A is a plan view of an antenna element of radio frequency antenna of FIG. 1.

Referring now to FIG. 4, an exemplary one of radiators 74a . . . 74n, here radiator 74d, is shown to include a center conductor 78 disposed between two bonded sections 80, 82 of a dielectric material. Such dielectric material is here Duroid 5880 manufactured by Rogers Corp., Chander, Ariz. The outer surfaces (not numbered) of sections 80, 82 have deposited or printed thereon a conducting material, here copper, to form ground planes for center conductor 78. A notch 84 is formed, here by means of etching, on the outer surfaces of sections 80, 82. The notch 84 is flared from a narrow portion whose width is 0.040 inches to a wide portion whose width is 0.375±0.002 inches. Packaging constraints restricted the depth, dimension a, of radiator 74d to also be 0.375±0.002 inches. Such a depth compounded the radiator matching problem at the low end of the operating frequency band because such a depth is "short" in terms of wavelength at such frequencies. The tapered sections 86, 86' of notch 84 were designed to provide the optimum impedance match over the operating frequency band of 6.5 to 16.5 GHz. Exemplary tapered section 86 (FIG. 4A) described an are of a circle the center of which is located at the intersection of a normal 88 to the center of a line drawn through tangent points band c, with a normal 90 to tangent point c. Center conductor 78 which feeds notch 84 is terminated in an open circuit beyond the narrow portion of notch 84.

Radiator 74d also includes a notch (here shown as notch 92 in adjacent radiator 74i) cut into sections 80, 82 for mating with a slot (here shown as slot 94 in radiator 74j) in radiator 74e. To form a circularly polarized element, radiators 74d, 74e are connected together and their ground planes are physically joined together here by means of solder (not shown). Center conductors 78, 78' are connected together by means of a stripline right angle section 96 (hereinafter sometimes referred to simply as right angle 96). Tabs 98, 98' protruding from right angle 96 are soldered to center conductors 78, 78'. Dielectric plugs 100, 100' are then inserted over tabs 98, 98' and sections of copper tape (not shown) are placed over dielectric plugs 100, 100' in order to maintain ground plane continuity. As mentioned hereinabove, radiators 74d, 74e are fed in phase quadrature, the 90° phase delay being realized here by means of the additional length of center conductor circuitry needed to feed radiator 74e from the common feed point 102. Such common feed point 102 is connected to a feed network 104 (shown in detail in FIG. 5 and to be described hereinafter) by means of a second stripline right angle section 106.

Referring back now to FIG. 3, R.F. receiver 28 is shown to include a feed network 104, a monopulse arithmetic unit 108, and a mixer network 110, all of which are fabricated in annular stripline multilayer packages. The details of each of said networks will be described with reference to FIG. 5 where the circuitry required to feed a single quadrant of array 72 is shown. Feed network 104 includes an upper dielectric section 109 and a lower dielectric section 111. Such dielectric sections are here 0.031±0.001 inch thick sections of Duroid 5880 material. The outer surfaces (not numbered) of dielectric sections 109 and 111 have a layer of conductive material, here copper, deposited or printed thereon. The inner surface (not numbered) of dielectric section 109 contains center conductor circuitry 112 arranged here to form a reactive power divider (of conventional design) including output ports 114a . . . 114j for feeding one quadrant of array 72. Lower section 111 includes rectangular cutouts (not shown) positioned about output ports 114a . . . 114j. Stripline right angle sections, an exemplary one of which is numbered 106 in FIG. 4, each of which contains a pair of protruding tabs (not numbered), are inserted into such cutouts and a first one of said pair of protruding tabs is soldered to each of output ports 114a . . . 114j. A dielectric plug (not shown) is then inserted over said tabs and sections of copper tape (also not shown) are placed over said plugs in order to maintain ground plane continuity. The remaining tabs of such right angle sections (as 106, FIG. 4) which now extend from feed network 104 in a plane normal to the surface of dielectric section 109, are attached to feed points Can exemplary one of which is numbered 102 in FIG. 4) in array 72, as was explained in greater detail hereinabove.

Figure 5:
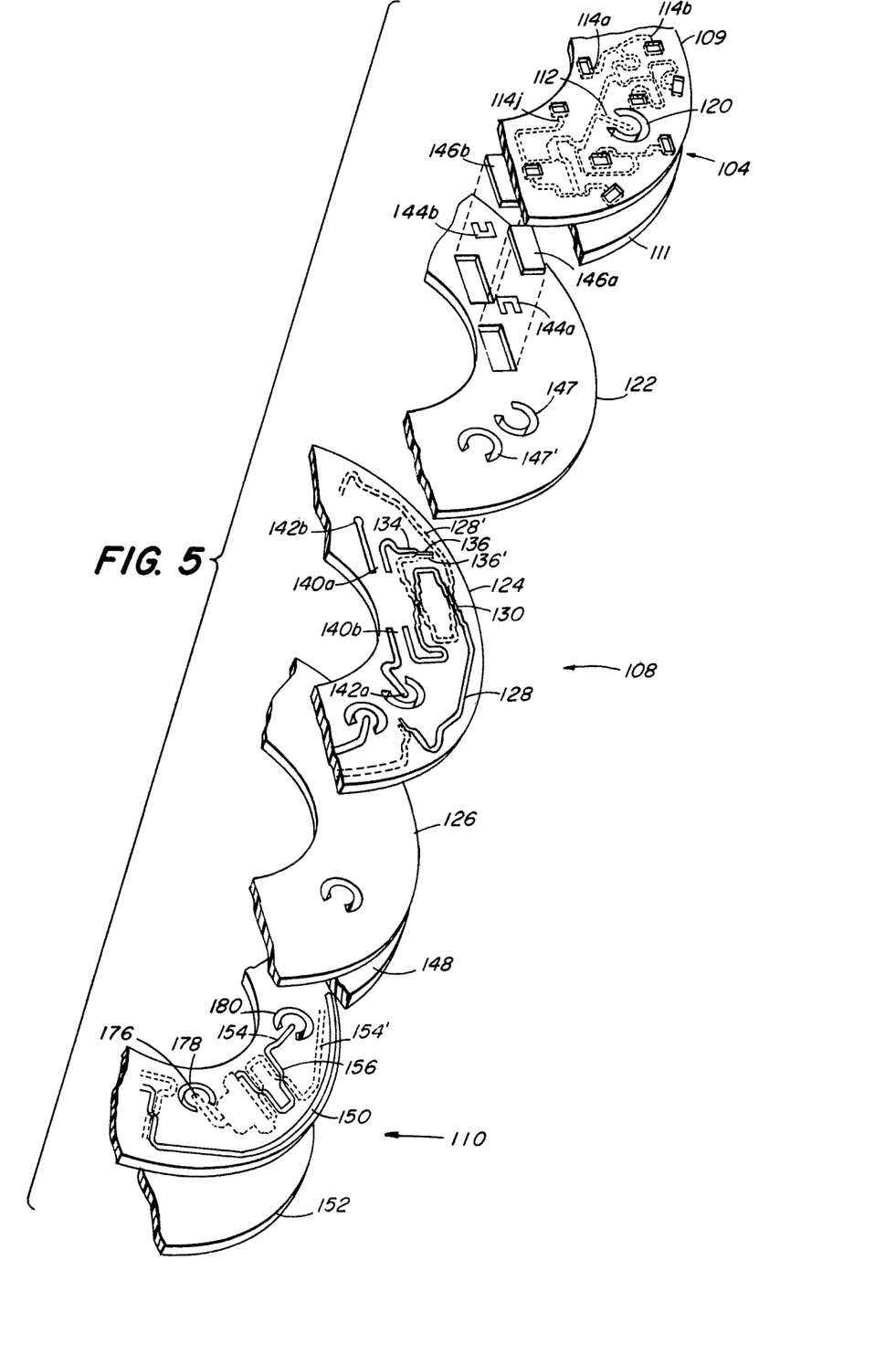
FIG. 5 is an isometric drawing, greatly simplified and exploded, of a portion of the R.F. receiver of FIG. 2 according to the invention.

Dielectric sections 109, 111 have four horseshoe-shaped cutouts, an exemplary one of which is here numbered 120, provided therein. Such horseshoe-shaped cutouts are used, in a manner to be described in greater detail hereinafter, to couple R.F. signals from feed network 104 to monopulse arithmetic unit 108. Monopulse arithmetic unit 108 includes an upper dielectric section 122, a center dielectric section 124, and a lower dielectric section 126. Dielectric sections 122, 126 are 0.031±0.001 inch thick Duroid 5880 material while dielectric section 124 is 0.007 inch±7% thick Duroid 5880 material. The outer surfaces (not numbered) of sections 122, 126 have a conductive material, here copper, deposited or printed thereon. Center dielectric section 124 has center conductor circuitry 128, 128' disposed on both the top and bottom surfaces thereof. Such center conductor circuitry 128, 128' is arranged in a conventional manner to provide a monopulse arithmetic unit for combining signals from each of the four quadrants of array 72 into sum (E) and two difference (A) signals (not shown). It should be noted here that conventional Magic Tee six quarter-wavelength hybrid rings for producing either in-phase or 180° out-of-phase output signals could not be used in forming the monopulse arithmetic unit because such hybrid rings are bandwidth limited. To realize performance over the 6.5 to 16.5 GHz frequency band, hybrid couplers having five quarter-wave coupled sections were used in the construction of monopulse arithmetic unit 108. Such a hybrid coupler is here numbered 130 and is described in an article entitled "Synthesis and Design of Wide-Band Equal-Ripple TEM Directional Couplers and Fixed Phase Shifters" by J. P. Shelton and J. A. Mosko, IEEE Transactions on Microwave Theory and Techniques, October 1966, pages 462-473. As is known, a quadrature phase relationship exists between the output ports (not numbered) of hybrid coupler 130; and Magic Tee hybrid junctions may be formed by inserting 90° phase shifters in the output ports of hybrid coupler 130. An exemplary one of such phase shifters is here numbered 134. Such a phase shifter is described in an article entitled "A New Class of Broad-Band Microwave 90-Degree Phase Shifters" by M. Schiffman, IRE Transactions On Microwave Theory and Techniques, April 1958, pages 232-237. The overlapping transmission line sections of such phase shifter are here a quarter-wavelength long at the center band frequency of 11 GHz, and the ends of such sections are shorted together by means of a strip of copper tape (not shown) which is inserted into a slot (also not shown) in center dielectric section 124 and soldered to transmission line sections 136, 136'. A total of four of such hybrid couplers and four of such phase shifters is arranged in a conventional manner to provide the broadband monopulse arithmetic unit 108. Included, but not shown, in monopulse arithmetic unit 108 is a stripline load terminating one of the ports of the sum channel hybrid. Such load will be described in greater detail hereinafter.

As mentioned hereinabove, boresight error requirements dictate that each of the quadrants of array 72 be fed in phase. To compensate for phase errors arising from manufacturing tolerances, phase trimmers, an exemplary pair of which are here numbered 140a, 140b, are included on each of the feed lines 142a, 142b connected to feed network 104. The parallel line sections (not numbered) of such phase trimmers are connected together by means of U-shaped sections of transmission lines 144a, 144b which may be positioned at any point along such parallel line sections to control the electrical length of feed lines 142a, 142b. Phase trimmers 140a, 140b are adjusted as a result of radiation pattern measurements of array 72 taken after feed network 104 and monopulse arithmetic unit 108 are affixed to array 72. Once the optimum position for each of phase trimmers 140a, 140b is determined, U-shaped sections 144a, 144b are soldered to the parallel line sections and dielectric plugs 146a, 146b, whose outer surfaces (not numbered) have a layer of copper deposited thereon, are inserted over U-shaped sections 144a, 144b. Dielectric sections 122, 124 and 126 have seven horseshoe-shaped cutouts, an exemplary pair of which is here numbered 147, 147', provided therein. For the sake of clarity, such pair of cutouts are only shown in dielectric section 122. Such horseshoe-shaped cutouts are used, in a manner to be described in greater detail hereinafter, to couple RF signals from feed network 104 to monopulse arithmetic unit 108 and from monopulse arithmetic unit 108 to mixer network 110.

Mixer network 110 includes an upper dielectric section 148, a center dielectric section 150, and a lower dielectric section 152. Dielectric sections 148, 152 are 0.025±0.001 inch thick sections of Duroid 5880 while center dielectric section 150 is a 0.005 inch, ±7%, thick section of Duroid 5880 material. The outer surfaces (not numbered) of sections 148, 152 have a conductive material, here copper, deposited or printed thereon. Dielectric sections 148, 150 and 152 have a total of seven horseshoe-shaped cutouts, an exemplary pair of which are here numbered 178, 180, provided therein. Again, for the sake of clarity, cutouts 178, 180 are shown only in dielectric section 150. Such horseshoe-shaped cutouts are used, in a manner to be described in greater detail hereinafter, to couple R.F. signals from monopulse arithmetic unit 108 to mixer network 110 and I.F. signals from mixer network 110 to I.F. receiver 16 (FIG. 1). Center dielectric section 150 has center conductor circuitry 154, 154' disposed on both the top and bottom surfaces thereof. Such center conductor circuitry is arranged in a conventional manner to provide five hybrid couplers, an exemplary one thereof here numbered 156, having three quarter-wave coupled sections. Three of such hybrid couplers form the primary networks for plug-in mixer sections (an exemplary one of which is here numbered 158 and is shown in detail in FIG. 6) and the remaining two form a distribution network for LO signals from I.F. receiver 16 (FIG. 1).

It should be noted here that, while hybrid coupler 156 (FIG. 6A) has three quarter-wave coupled sections, a longer coupler having five quarter-wave coupled sections would have been preferable for bandwidth considerations. A longer coupler, however, could not be fit into the available area. This is so because the inner diameter of mixer network 110 (FIG. 5) had to be made approximately 0.150 inches larger than the inner diameter of monopulse arithmetic unit 108 to provide the clearance required to allow R.F. antenna 26 and R.F. receiver 28 to gimbal ±400 about gimbal structure 70 (FIG. 2).

Figures 6, 8:
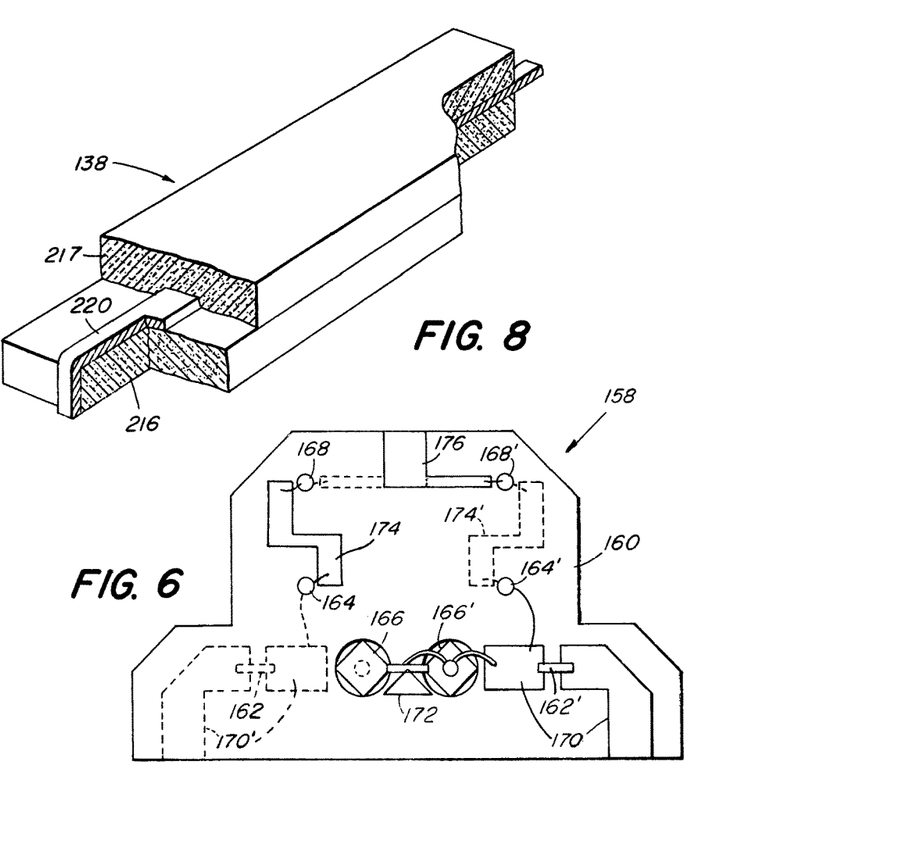
FIG. 6 is a plan view of the circuitry of a balanced mixer according to the invention.
FIG. 8 is a partially cut-away view of a radio frequency load for use with a stripline circuit.
Figure 6A:
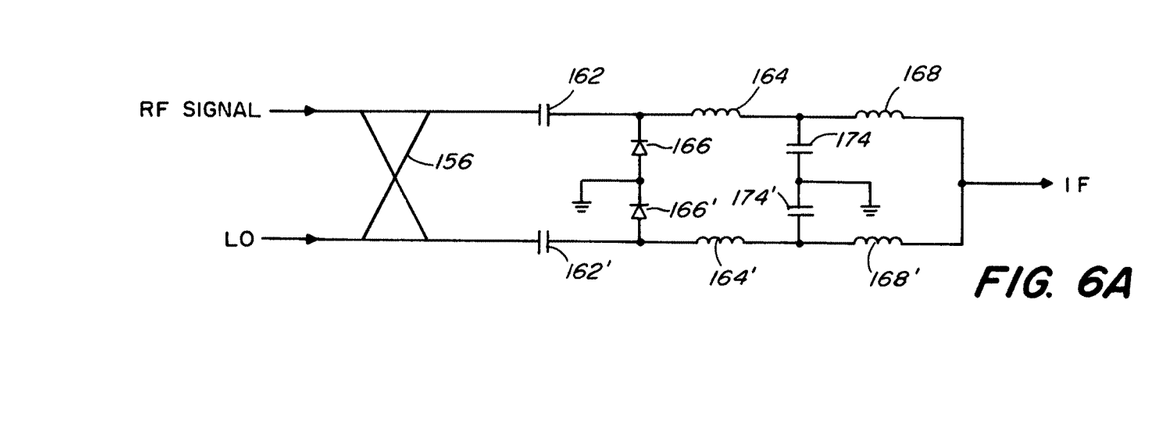
FIG. 6A is a schematic diagram useful in the understanding of the mixer.

Referring now to FIG. 6, mixer 158 is shown to include a dielectric section 160, a pair of beam lead capacitors 162, 162', a first pair of inductors 164, 164', a pair of mixer diodes 166, 166', and a second pair of inductors 168, 168'. Such devices are arranged, as is shown in FIG. 6A, to provide a balanced mixer that converts radio frequency signals from monopulse arithmetic unit 108 (FIG. 5) to I.F. signals for I.F. receiver 16 (FIG. 1). Dielectric section 160 is here a 0.005±7% inch thick piece of Duroid 5880 material with center conductor circuitry 170, 170' disposed on both sides thereof. Beam lead capacitors 162, 162' are here SC9001C devices in a 130-011 package from Alpha Industries, Inc., Woburn, Mass. Capacitors having capacitance in the range of 2.2 to 4.7 picofarads were found to provide suitable performance. Beam lead capacitors 162, 162' are thermal-compression bonded, respectively, to center conductor circuitry 170, 170' across gaps (not numbered) in such circuitry. Mixer diodes 166, 166' are here HP style 5082-2208 Schottky barrier diodes from Hewlett-Packard Corp., Palo Alto, Calif. Diodes 166, 166' are inserted between gaps (not numbered) in center conductor circuitry 170, 170' and the diode leads (not numbered) are thermal compression bonded to the center conductor circuitry on either side of such gaps. The sections of center conductor circuitry 170, 170' disposed between diodes 166, 166' are shorted together by means of a strip of copper (not shown) extending through dielectric section 160 and soldered to both sections. Triangular-shaped sections, similar to the one indicated by the numeral 172, of center conductor material are disposed adjacent such shorted sections. A triangular-shaped section of copper (not shown)

which is 0.025±0.002 inches thick is then soldered to triangular section 172 to extend through dielectric section 148 (FIG. 5) to contact the layer of copper disposed on the outer surfaces of sections 148, finally to provide a short circuit between diodes 166, 166'. A first pair of inductors 164, 164', which here comprise 1½ turns of 0.0015 inch diameter copper wire coated with a suitable high temperature insulation material (not shown) are inserted into 0.030 inch diameter holes (not numbered) in dielectric section 160. A first end of each of inductors 164, 164' is affixed to the sections of center conductor circuitry 170, 170' disposed between capacitors 162, 162' and mixer diodes 166, 166'. A second end of each of inductors 164, 164' is attached to distributed capacitors 174, 174', here formed by sections of center conductor material. A second pair of inductors 168, 168', which here comprise 2½ turns of 0.0015 inch diameter copper wire coated with a suitable high temperature insulation material (not shown), are inserted into 0.030 inch diameter holes (not numbered) in dielectric section 160 and a first end of each of inductors 168, 168' is attached to distributed capacitors 174, 174'. A second end of each of inductors 168, 168' is attached to I.F. output terminal 176. Mixer 158 is fabricated external to mixer network 110 (FIG. 5) and is subsequently inserted into cutouts (not numbered) provided in center dielectric section 150 (FIG. 5). Strips of copper tape (not shown) are used to attach the center conductor circuitry 170, 170' of mixer 158 to the center conductor circuitry 154, 154' of hybrid coupler 156 (FIG. 5). I.F. output terminal 176 is attached to center conductor circuitry 154' of mixer network 110 (FIG. 5) in a similar manner.

In operation, beam lead capacitors 162, 162' prevent the I.F. from mixer 158 from reaching other components such as terminations and other mixers within mixer network 110 (FIG. 5). Inductors 164, 164' interact with distributed capacitors 174, 174' and inductors 168, 168' to form a low pass filter network which prevents the R.F. input signals from reaching the I.F. output terminal 176 while allowing the I.F. signal to do so with little or no attenuation. Mixer diodes 166, 166' are biased by feeding, at one of the two input ports of hybrid coupler 156 (FIG. 5), a local oscillator signal whose magnitude is at least 2.0 milliwatts. The local oscillator signal is provided to mixer network 110 (FIG. 5) from I.F. receiver 16 (FIG. 1) and is subsequently divided in a conventional manner by a pair of hybrid couplers (not shown) to provide local oscillator signals for each of the three mixers contained within mixer network 110.

Figure 6B:
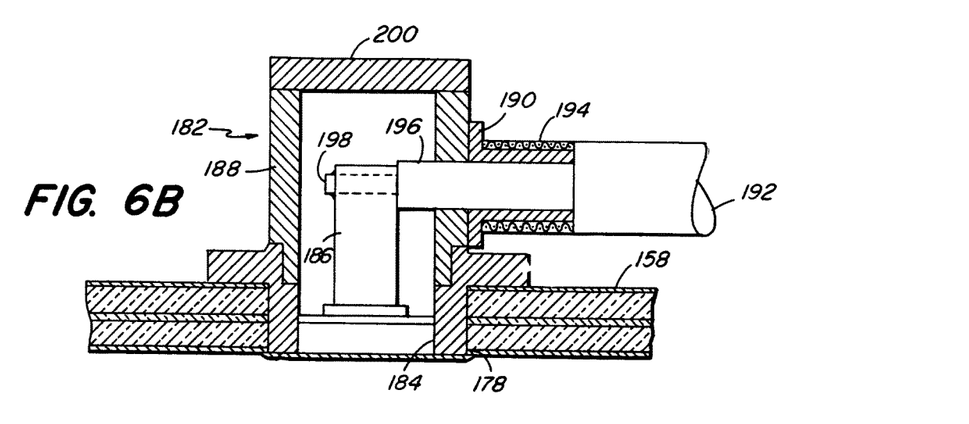
FIG. 6B is a sectional view of a stripline-to-coaxial cable transition.

The monopulse sum and difference signals as well as the local oscillator signals are coupled between mixer network 110 and I.F. receiver 16 via extremely flexible coaxial cables, a portion of one of which is numbered 192 and is shown in FIG. 6B, in order to reduce the load on the gimbal motor. Such cables are here No. 32-ET-740, from Thermax Wire Corp., 304 E. 45th St., New York 17, N.Y. The interface of such cables with I.F. receiver 16 (FIG. 1) is made via conventional connectors. The clearance required to gimbal R.F. antenna 26 and R.F. receiver 28 (FIG. 1) necessitated the use of special right angle transitions, an exemplary one of which is numbered 182 and is shown in detail in FIG. 6B, to interface with mixer network 110. As mentioned hereinabove, a total of seven horseshoe-shaped cutouts are provided through dielectric sections 148, 150 and 152 (FIG. 5). Once such sections are bonded together, here by means of a conventional thermal-compression bonding process, the horseshoe-shaped cutouts are plated and tinned. Two different methods exist for interfacing with such tinned cutouts, depending upon whether a right angle transition to I.F. receiver 16 (FIG. 1) or a straight through transition to monopulse arithmetic unit 108 (FIG. 5) is being made. An exemplary cutout around the right angle transition 182 is numbered 178 in FIG. 5 while an exemplary cutout around the connection to monopulse arithmetic unit 108 is there numbered 180.

Referring still to FIG. 6B, right angle transition 182 is shown to include a horseshoe-shaped member 184 having a flange (not numbered) which is soldered to tinned cutout 178. A metal tab 186 is then inserted through a hole (not numbered) provided in dielectric section 158 and soldered to center conductor circuitry 174' (FIG. 6). A cylindrical housing 188, having a hole (not numbered) in its wall, is then attached, in any convenient manner, here by means of solder, to horseshoe-shaped member 184. A metal sleeve 190 is mounted, in any convenient manner, to cylindrical housing 188 around the hole provided in such housing. That portion of coaxial cable 192 that mates with right angle transition 182 has its outer conductor 194 stripped back to expose dielectric section 196 and center conductor 198. Outer conductor 194 is soldered to sleeve 190 and dielectric section 196 extends through such sleeve to allow center conductor 198 to engage a hole (not numbered) provided in metal tab 186. Center conductor 198 is soldered to metal tab 186 and then a metal cap 200 is attached, in any convenient manner, to cylindrical housing 188 to complete the assembly of right angle transition 182.

Figure 7:
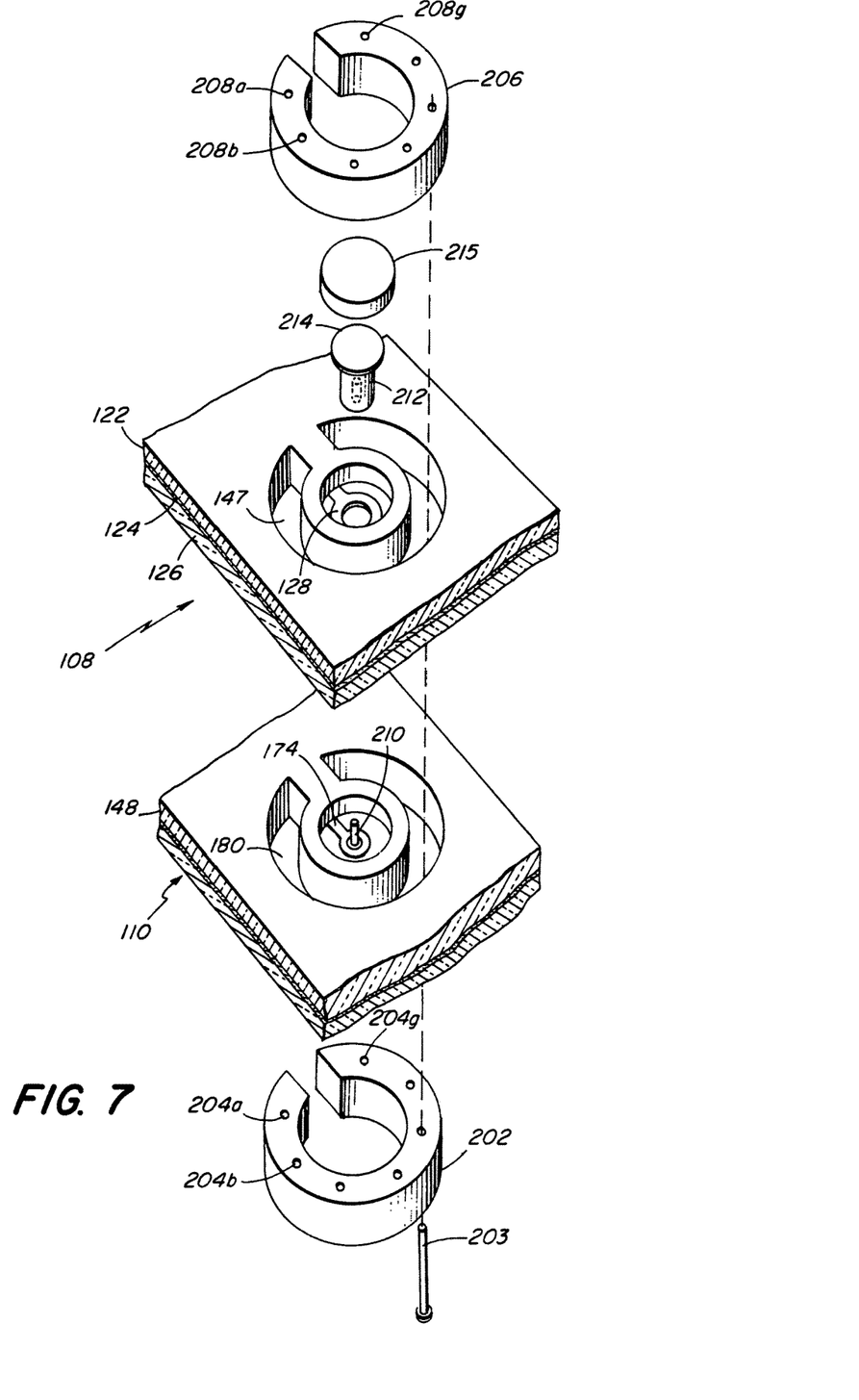
FIG. 7 is an isometric drawing, greatly simplified and exploded, illustrating the interconnection between various sections of radio frequency receiver of FIG. 2.

Referring now to FIG. 7, an exemplary transition between mixer network 110 and monopulse arithmetic unit 108 will be described. After the mixer network 110 and monopulse arithmetic unit 108 have been bonded, the walls of exemplary horseshoe-shaped cutouts 147, 180 are plated and tinned, in any convenient manner.

A horseshoe-shaped ring 202, having a plurality of countersunk clearance holes 204a ... 204g provided therein, is soldered to the walls (not numbered) of horseshoe-shaped cutout 180; and a similarly shaped ring 206, having a plurality of tapped holes 208a ... 208g provided therein, is soldered to the walls (also not numbered) of horseshoe-shaped cutout 147. A metal pin 210 is inserted through a hole (not numbered) in dielectric section 148 and is soldered to center conductor circuitry 174. A metal contact 212, having a flange 214, is inserted into a cutout (not numbered) provided in dielectric section 122. The body of contact 212 is hollow and its diameter is dimensioned so that it extends through holes (not numbered) provided in center conductor circuitry 128 and dielectric sections 124 and 126 and is finally soldered to pin 210. A dielectric plug 215 is then inserted into the cutout provided in dielectric section 122 and a strip of copper (not shown) is placed over plug 215 and soldered to the copper ground plane (not numbered). Screws, an exemplary one of which is here numbered 203, then extend through countersunk clearance holes 204a ... 204g in ring 202 and engage the tapped holes 208a ... 208g in ring 206, thereby securing mixer network 110 to monopulse arithmetic unit 108. The interface between power distribution network 104 and monopulse arithmetic unit 108 (FIG. 5) is realized in a similar manner. It should be noted here that stripline right angle sections 106 (FIG. 4) are affixed to power distribution network 104 before it is attached to monopulse arithmetic unit 108.

As mentioned hereinabove, a stripline load is provided in monopulse arithmetic unit 108 to terminate one port of the sum channel hybrid. Similar loads (not shown) are used to terminate one port of each of the hybrids forming the local oscillator distribution network of mixer network 110. An exemplary stripline load 138 is shown in FIG. 8 to include an upper section 217 and a lower section 216 of dielectric material which is here MF 117 manufactured by Emerson and Cumming, Inc., Canton, Mass. Upper section 217 has a slot (not numbered) milled therein which fits over center conductor 220 which is attached, in any convenient manner, to lower section 216. Center conductor 220 is shown to extend along the top surface (not numbered) and down one side (also not numbered), finally to terminate at the bottom surface of section 216 where it is eventually shorted to the ground plane of monopulse arithmetic unit 108 (FIG. 5). A portion (not numbered) of center conductor 220 extends beyond section 216 and is attached, in any convenient manner, to center conductor circuitry forming the sum channel hybrid. Sections 216, 217 are attached together in any convenient manner to form stripline load 138 which fits within rectangular sections (not shown) milled in dielectric sections 122, 126 (FIG. 5). Sections 216 and 217 are dimensioned so that they fit flush with the outside surfaces (not numbered) of dielectric sections 122, 126 (FIG. 5). After dielectric sections 122, 124 and 126 (FIG. 5) are bonded together, the outside surfaces of sections 216, 217 are plated, thereby to maintain ground plane continuity and short circuit center conductor 220 to such ground plane.

Referring back now to FIG. 3, array 72, which is connected to R.F. receiver 28 as described hereinabove, is shown to be mounted to a support ring 222, which is here made of plexiglass so as not to short out the radiators of array 72 in contact therewith. The lower portion (not numbered) of support ring 222 contains a metal ring 224 bonded to its inner surface (also not numbered). The inside surface (not numbered) of metal ring 224 is contoured to mate with gimbal structure 70 (FIG. 2). Tabs 230a . . . 230d are provided on the rear surface of ring 224. An annular dielectric lens 231 having a contoured front face 232 is bonded to the top of array 72. The curvature of the lens front face 232 is set to provide an equal phase delay to the R.F. energy passing through primary reflector 32 (FIG. 2) to array 72. A retaining ring, numbered 234 and shown in FIG. 2, is threaded to gimbal structure 70 and forces support ring 222 against gimbal structure 70. Set screws, an exemplary one of which is numbered 236 in FIG. 2, are provided in retaining ring 234 and engage tabs 230a . . . 230d in metal ring 224. Such set screws are used to adjust the position of R.F. antenna 26 to align the boresight axis of R.F. antenna 26.

Figure 9:
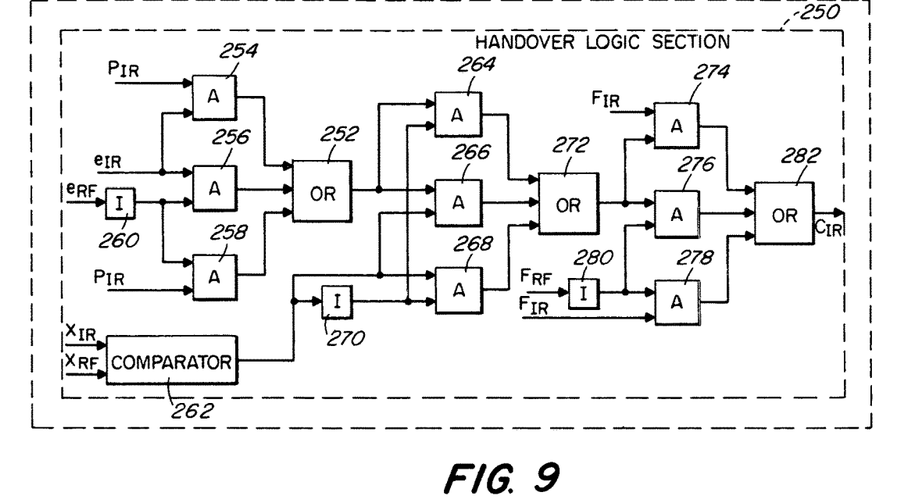
FIG. 9 is a schematic diagram for the handover logic circuitry of processor and controller of FIG. 1.

Referring now to FIG. 9, the handover logic section 250 of processor and controller 18 will be described. The sole output signal, which is labeled $C_{IR}$, from handover logic section 250 indicates when it is a logic "zero" that tracking on R.F. signals is preferred and when a logic "one", tracking on IR signals is preferred. The input signals to handover logic section 250 are digital signals corresponding to the output signals of the IR receiver 14 and the I.F. receiver 16. The input signals labeled $e_{IR}$ and $e_{RF}$ are derived, respectively, from IR receiver 14 and I.F., receiver 16 and, when a logic "one", they indicate that the respective receivers are receiving signals above a given threshold. The input signal labeled $P_{IR}$ is derived from IR receiver 14 and, when a logic "one", indicates that the signal-to-noise ratio in such receiver is greater than a predetermined value. As a result, then, frequent mode switching in response to target signature fluctuations (which would otherwise occur with weak targets) is prevented. The input signals labeled $X_{IR}$ and $X_{RF}$ are from RF receiver 14 and I.F., receiver 16, respectively, and are indicative of the signal-to-noise ratios within the respective receivers. Finally, the signals labeled $F_{RF}$ and $F_{IR}$ are command signals forcing the tracking loop to be closed, respectively, through either I.F. receiver 16 or IR receiver 14. Such command signals may be given prior to launch to designate one particular mode of operation, or they may be used for test purposes.

A three level decision process governs the $C_{IR}$ output signal from handover logic section 250 when the seeker for the ARM is in the automatic mode of operation. The first level decision signal appears on the output of OR gate 252 and indicates, in a manner to be described in greater detail hereinafter, that tracking through IR receiver 14 is preferred because: (1) only IR receiver 14 is locked, or (2) both IR receiver 14 and IF. receiver 16 are locked and the signal-to-noise ratio of IR receiver 14 is above a specified value or has been above that value and has not fallen below a lower specified value. When IR receiver 14 is locked, a logic "one" appears at one input terminal of both AND gates 254 and 256. The second input to AND gate 254 is logic "one" when the signal-to-noise ratio of IR receiver 14 exceeds a specified value. If both inputs to AND gate 254 are logic "ones", a logic "one" appears on one of the inputs of OR gate 252 causing the output from such gate to be a logic "one" indicating that IR tracking is preferred. If only IR receiver 14 is locked logic "ones" will appear on both input terminals of AND gate 256 as the logic "zero" indicating the absence of lock in I.F. receiver 16 is converted to a logic "one" by inverter 260, and, therefore, a logic one will appear on the output of AND gate 256 causing the output of OR gate 252 to be a logic "one", indicating that IR tracking is preferred. A logic "zero" from OR gate 252, indicating that tracking through I.F. receiver 16 is preferred, is obtained when I.F. receiver 16 is locked and either IR receiver 14 is not locked, or if IR receiver 14 is locked, its signal-to-noise ratio is not above the specified threshold.

The output signal from OR gate 252 is processed with the output signal from digital comparator 262, which is here of conventional design, in AND gates 264, 266 and 268, inverter 270 and OR gate 272 to provide the second level decision signal at the output of OR gate 272. Such second level decision signal, when a logic "one", indicates that tracking through I.F. receiver 16 is preferred because: (1) the first level decision signal from OR gate 252 is a logic "one" and the signal-to-noise ratio in IF receiver 16 is not sufficiently larger than the signal-to-noise ratio in IR receiver 14 to override the first level decision signal from OR gate 252, or (2) the first level decision signal from OR gate 252 is a logic "zero", indicating that tracking through I.F. receiver 16 is preferred but the signal-to-noise ratio in IR receiver 14 is sufficiently larger than the signal-to-noise ratio in I.F. receiver 16 to override the preferential I.F. tracking signal from OR gate 252. The signal-to-noise ratios of the respective receivers are compared in comparator 262 and a logic "one" from comparator 262 indicates that the signal-to-noise ratio of IR receiver 14 is greater than that of I.F. receiver 16 and, conversely, a logic "zero" from comparator 262 indicates that the signal-to-noise ratio of I.F. receiver 16 is greater than that of IR receiver 14.

The second level decision from the OR gate 272 is processed, in a manner similar to that described hereinabove, with either $F_{RF}$ or $F_{IR}$ command signals in AND gates 274, 276 and 278, inverter 280 and OR gate 282 to provide the third level decision signal, $C_{IR}$, on the output of OR gate 282. The $C_{IR}$ signal (when a logic "one") commands tracking through IR receiver 14 because: (1) IR tracking has been forced by the $F_{IR}$ command, or (2) because there is no $F_{RF}$ command and the second level decision from OR gate 272 is a logic "one".

From the foregoing, it will be apparent to one of skill in the art that a dual mode seeker for the ARM according to this invention need not be limited to its disclosed embodiment but may be deemed to include any dual mode seeker for the ARM utilizing any chosen characteristics of received signals to control the mode of operation of the seeker for the ARM. Further, it will be apparent that mechanical details of the various novel elements disclosed may be changed without departing from the inventive concepts disclosed and described. It is felt, therefore, that this invention should not be restricted to its disclosed embodiment, but rather should be limited only by the spirit and scope of the appended claims.

What is claimed is:

1. A dual mode seeker for a missile, such seeker being selectively responsive to either infrared or radio frequency energy radiated from a target to produce guidance signals, such seeker comprising:
    (a) a gimbal arrangement having two degrees of freedom with respect to the longitudinal axis of said missile;
    (b) an optical receiving system, responsive to infrared energy from said target, for deriving first guidance signals for said missile, such optical receiving system including a Cassegrainian telescope having a rear surface primary mirror for directing the infrared energy to a sensor mounted in said gimbal system;
    (c) a radio frequency receiving system, responsive to radio frequency energy from said target, for deriving second guidance signals for said missile, such radio frequency receiving system including an antenna mounted in said gimbal arrangement behind said primary mirror and around said sensor whereby the boresight axes of said sensor and said antenna are coincident and a refractive lens disposed between said primary mirror and said antenna, such lens having a shape to collimate radio frequency energy passing through such mirror; and
    (d) selection means, responsive to the first and second guidance signals, for determining the particular one of such signals to control the flight of said missile.

2. A dual mode seeker as in claim 1 wherein the antenna comprises an orthogonal array of end-fired stripline antenna elements.

3. A dual mode seeker as in claim 2 wherein orthogonal pairs of the antenna elements are fed, in phase quadrature, from a single feed point.

4. A dual mode seeker as in claim 3 having, additionally:
    (a) a radio frequency power divider network coupled to individual ones of said feed ports; and
    (b) a radio frequency arithmetic unit connected to said power divider network to form a monopulse receiving arrangement for the radio frequency receiving system.

5. A dual mode seeker as in claim 4 wherein the selection means comprises:
    (a) logic circuitry, responsive to the relative amplitudes, with respect to noise, of the infrared signals out of the sensor and the radio frequency signals out of the antenna, for selecting one or the other of the first and the second guidance signals; and
    (b) logic circuitry, responsive to predetermined control signals applied before flight of said missile for selecting one or the other of the optical receiving system or the radio frequency receiving system to produce guidance signals during the initial stage of flight of said missile.

6. A dual mode seeker as in claim 5 wherein said optical receiving system and said radio frequency receiving system share a common aperture.

* * * * *